(12) United States Patent
Fedor

(10) Patent No.: US 6,997,660 B2
(45) Date of Patent: Feb. 14, 2006

(54) PLUG AND PENCIL FOR ENGINE

(76) Inventor: Michael E. Fedor, 140 Highview Dr., Woodbridge, NJ (US) 07095

( * ) Notice: Subject to any disclaimer, the term of this patent is extended or adjusted under 35 U.S.C. 154(b) by 0 days.

(21) Appl. No.: 10/959,926

(22) Filed: Oct. 5, 2004

(65) Prior Publication Data

US 2005/0025608 A1  Feb. 3, 2005

(51) Int. Cl.
*F16B 35/00*  (2006.01)
(52) U.S. Cl. .................................................... 411/383
(58) Field of Classification Search ............... 411/178, 411/383, 5, 243, 397
See application file for complete search history.

(56) References Cited

U.S. PATENT DOCUMENTS

| | | | | |
|---|---|---|---|---|
| 2,358,981 A | | 9/1944 | Lattner ....................... 204/197 |
| 2,755,932 A | * | 7/1956 | Cohn .......................... 210/222 |
| 2,771,262 A | * | 11/1956 | Laystrom ..................... 248/489 |
| 3,423,305 A | * | 1/1969 | Tausk ........................ 204/196.15 |
| 3,854,372 A | | 12/1974 | Gutshall ........................ 85/61 |
| 4,043,239 A | * | 8/1977 | DeFusco ..................... 411/337 |
| 4,077,742 A | | 3/1978 | Goodwin ..................... 416/245 |
| 4,295,767 A | | 10/1981 | Temple, Jr. .................. 411/377 |
| 4,411,742 A | | 10/1983 | Donakowski et al. ......... 204/16 |
| 4,544,465 A | | 10/1985 | Marsh ......................... 204/148 |
| 4,759,181 A | | 7/1988 | Biritz ......................... 602/321 |
| 4,802,807 A | | 2/1989 | Offenburger et al. ....... 411/109 |
| 4,810,148 A | * | 3/1989 | Aisa et al. ................... 411/383 |
| 5,373,728 A | * | 12/1994 | Guentzler ............. 204/196.07 |
| 5,406,983 A | | 4/1995 | Chambers et al. .......... 138/109 |
| 5,563,585 A | | 10/1996 | MacDonald ................. 340/626 |
| 5,582,496 A | * | 12/1996 | Ambrico et al. ............. 411/432 |
| 5,599,183 A | | 2/1997 | Razdolsky et al. ........... 433/53 |
| 5,770,256 A | | 6/1998 | Ekern et al. ................... 427/59 |
| 5,971,007 A | | 10/1999 | Harcourt et al. ............ 137/246 |
| 6,126,355 A | | 10/2000 | Clover, Jr. .................... 403/13 |
| 6,196,781 B1 | * | 3/2001 | Yang .......................... 411/384 |
| 6,464,109 B1 | | 10/2002 | Harris ......................... 222/160 |
| 6,652,208 B1 | | 11/2003 | Gillis ......................... 411/107 |
| 2003/0203218 A1 | | 10/2003 | Martin et al. | |

FOREIGN PATENT DOCUMENTS

JP   11141525   5/1999

OTHER PUBLICATIONS http://www.rose-hulman.edu/~moloney/AppComp/2000Entries/Entry02/entry02.htm (4 pages) (Printed Aug. 25, 2004).
http://www.hanessupply.com/catalog/show_page.asp?sec=026&page=0064 (2 pages) (Printed Aug. 25, 2004).

* cited by examiner

*Primary Examiner*—Flemming Saether
(74) *Attorney, Agent, or Firm*—Walter J. Tencza, Jr.

(57) ABSTRACT

A first portion or plug and a second portion or pencil are provided, for use in a device, such as a marine engine. The first portion or plug may have an outer surface with external threads and a cavity with internal threads. The external threads of the first portion or plug may be threaded oppositely from the internal threads inside the cavity of the first portion or plug. The opposite threading allows the plug and pencil combination to be detached and unscrewed from an engine without the plug and pencil coming apart.

13 Claims, 4 Drawing Sheets

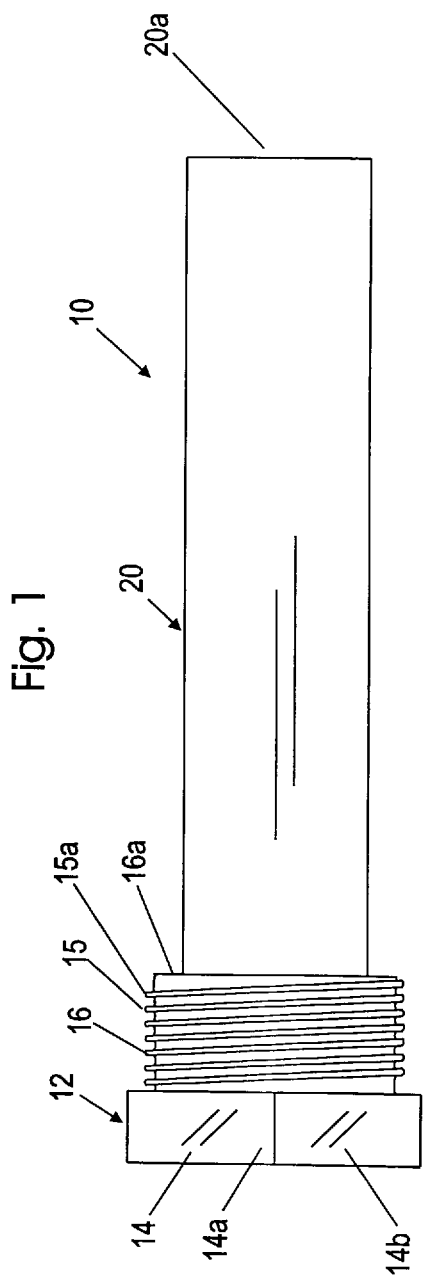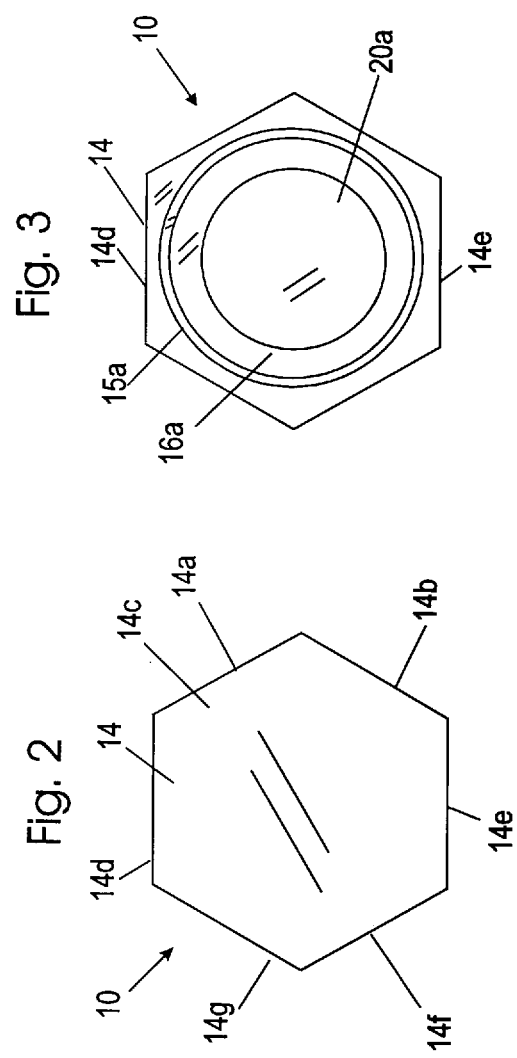

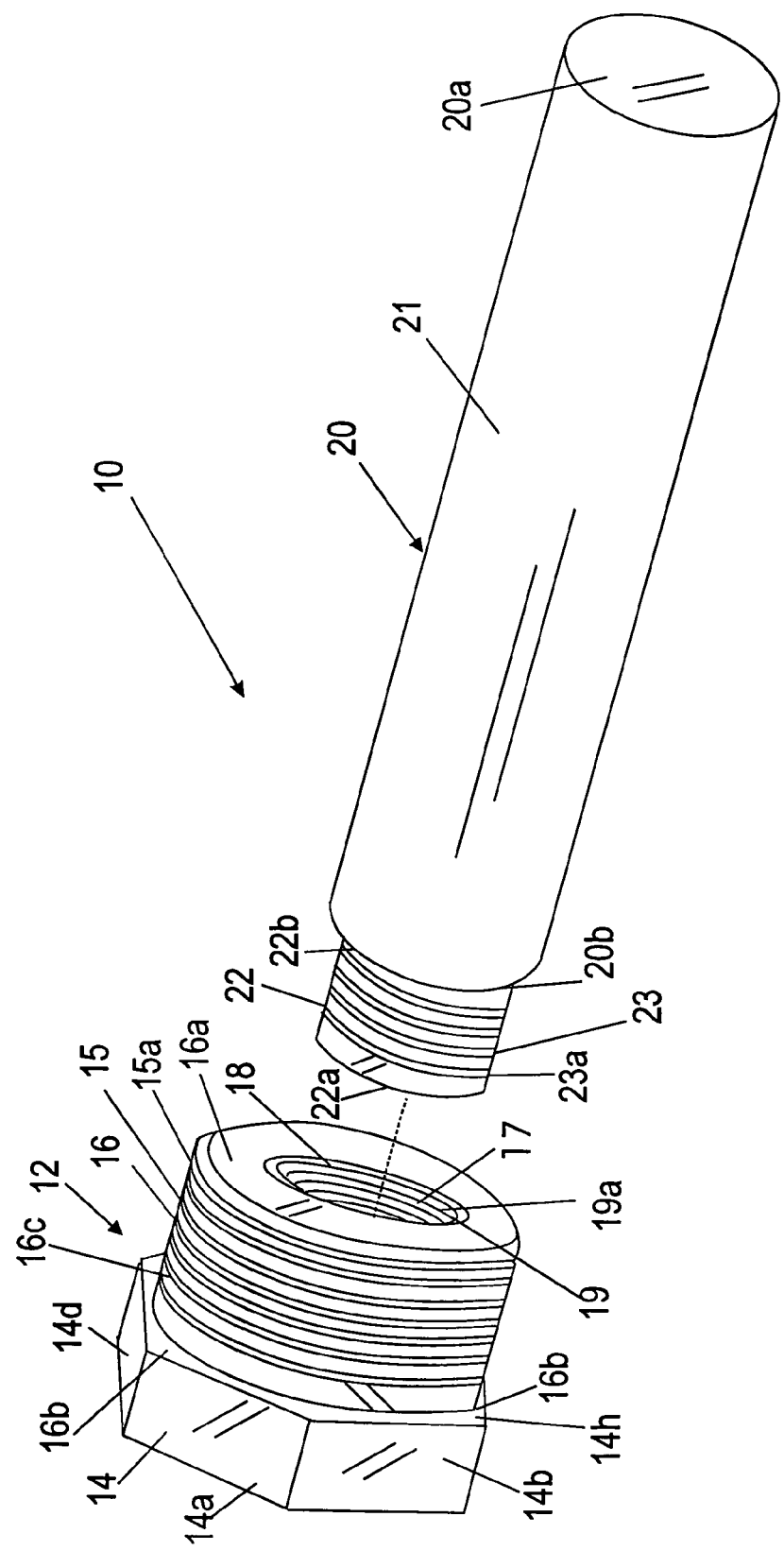

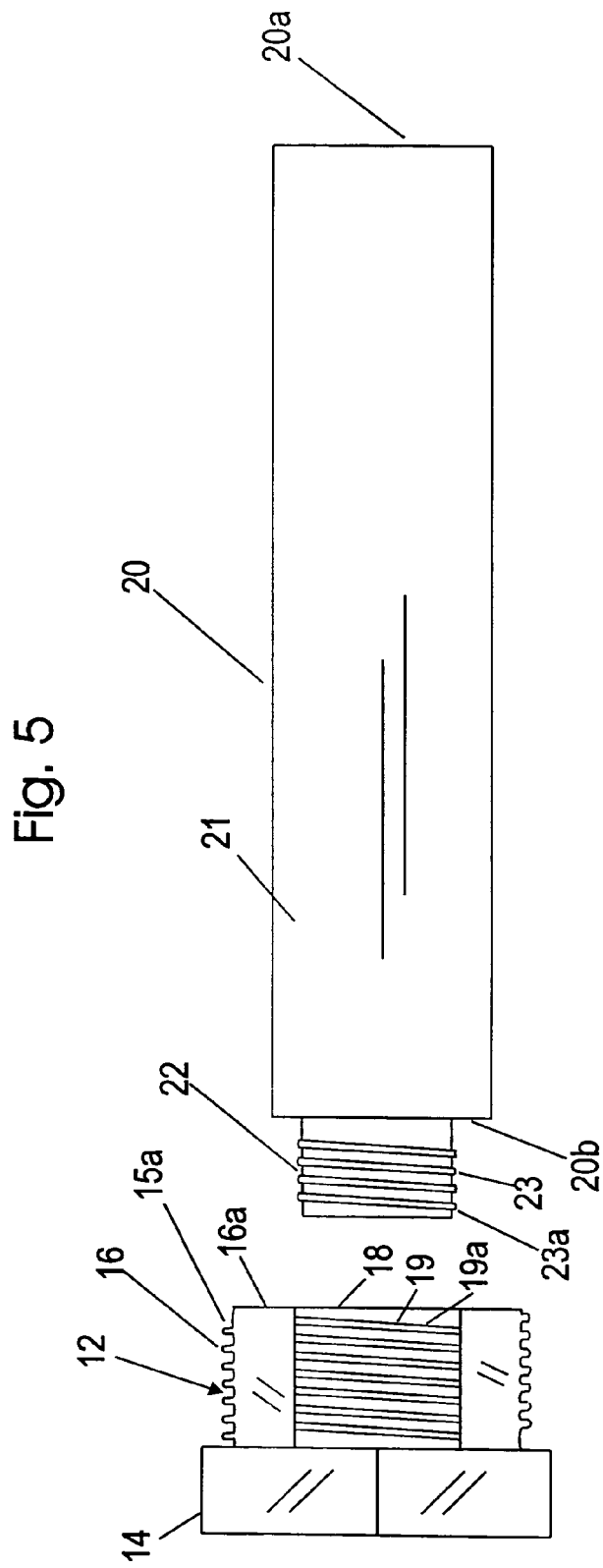

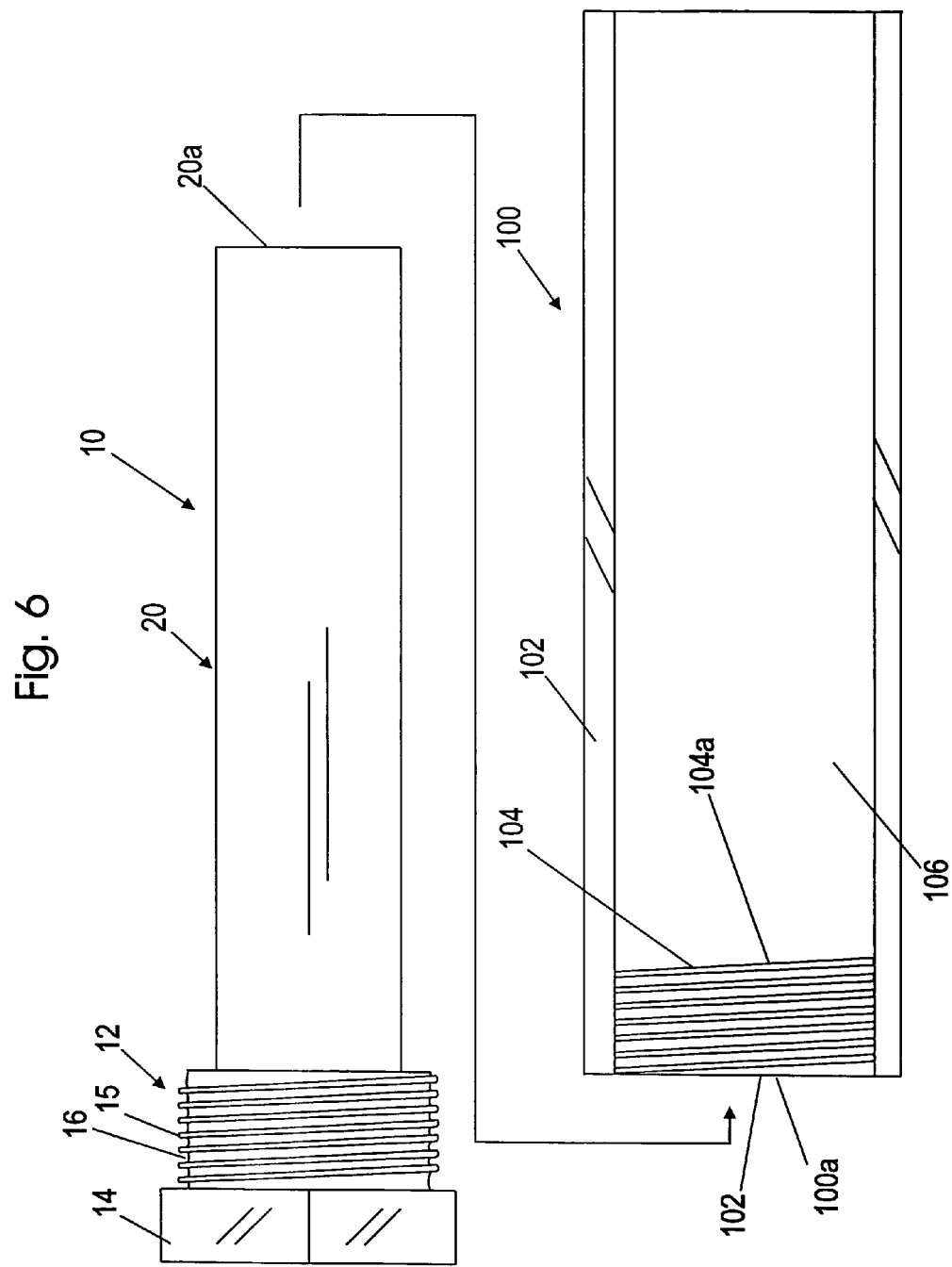

PLUG AND PENCIL FOR ENGINE

FIELD OF THE INVENTION

This invention relates to plugs and pencils, such as brass plugs and zinc pencils, for use in engines, such as marine engines.

BACKGROUND OF THE INVENTION

Zinc pencils and brass plugs are often used, for example, in marine engines to help reduce or prevent the effects of electrolysis. Typical prior art brass plugs, used with zinc pencils, have outer threads and a cavity with inner threads, which are threaded in the same direction as the outer threads. During operation the zinc pencil will corrode, expand and form a crust on the outside of the zinc pencil. This makes the pencil diameter larger then the cavity of the engine into which the pencil was placed, making it difficult to remove the pencil from the engine cavity.

To remove a zinc pencil from an engine cavity one would turn the plug in a counter clockwise direction (for example) to unscrew the plug from the engine cavity. However, when the zinc pencil is corroded the zinc pencil will not move easily and turning the plug in the counter clockwise direction while the zinc pencil is not moving will cause the pencil to unscrew from the plug. This is because the outer threads on the plug and the inner threads in the cavity of the plug are threaded in the same direction.

If the pencil unscrews from the plug while the pencil is in the engine cavity, the pencil may fall into the cooling system of the engine. This can cause various undesirable results including restricted water flow in the engine.

SUMMARY OF THE INVENTION

The present invention in one embodiment provides a first portion or plug and a second portion or pencil for use in a device, such as a marine engine. The first portion or plug may have an outer surface with external threads and a cavity with internal threads. The external threads of the first portion or plug may be threaded oppositely from the internal threads inside the cavity of the first portion or plug. The opposite threading allows the plug and pencil combination to be detached and unscrewed from an engine without the plug and pencil coming apart.

BRIEF DESCRIPTION OF THE DRAWINGS

FIG. 1 shows a front view of an apparatus in accordance with an embodiment of the present invention;

FIG. 2 shows a left side view of the apparatus of FIG. 1;

FIG. 3 shows a right side view of the apparatus of FIG. 1;

FIG. 4 shows a perspective view of the apparatus of FIG. 1 with a first portion of the apparatus separated from a second portion of the apparatus;

FIG. 5 shows a cross sectional front view of the first portion of FIG. 1 along with a front view of the second portion of the apparatus of FIG. 1; and FIG. 6 shows a front view of the apparatus of FIG. 1 along with a cross sectional front view of a device into which part of the apparatus of FIG. 1 may be inserted.

DETAILED DESCRIPTION OF THE DRAWINGS

FIG. 1 shows a front view of an apparatus 10 in accordance with an embodiment of the present invention. FIG. 2 shows a left side view of the apparatus 10. FIG. 3 shows a right side view of the apparatus 10. FIG. 4 shows a perspective view of the apparatus 10 of FIG. 1 with a first portion or plug 12 of the apparatus 10 separated from a second portion or pencil 20 of the apparatus 10. FIG. 5 shows a cross sectional front view of the first portion 12 of FIG. 1 along with a front view of the second portion 20 of the apparatus 10 of FIG. 1.

The first portion 12 includes a hexagonal member 14 and a protrusion 16. The protrusion 16 may be substantially in the shape of a hollow cylinder along with a plurality of external threads or ridges 15 including thread or ridge 15a, extending from an outer surface 16c. The protrusion 16 may be substantially in the shape of a hollow cylinder having an opening 18 shown in FIG. 4. As shown in FIG. 4, internal threads or indentations 19, including thread or indentation 19a may be located inside of a cavity 17 in the protrusion or cylinder 16. The hexagonal member 14 and the protrusion 16 may be made of brass. The hexagonal member 14 may be comprised of sides 14a, 14b, 14d, 14e, 14f, and 14g as shown in FIG. 2. The hexagonal member 14 may include a surface 14b as also shown in FIG. 2.

The hexagonal member 14 may include a surface 14h, which is fixed to an end 16b of the protrusion 16, as shown in FIG. 4. The protrusion 16 also includes an end 16a, at which is located the opening 18. The opening 18 leads to the inner chamber or cavity 17 inside of the hollow protrusion or cylinder 16, in which is located the internal threads 19.

As shown in FIG. 4, the second portion 20 includes a solid cylinder 21 having an end 20a and an end 20b. The second portion 20 also includes a protrusion 22 which may be substantially in the shape of a solid cylinder having external threads or ridges 23, such as thread or ridge 23a. The protrusion 22 may be fixed at end 22b to end 20b of the solid cylinder 21.

When the portion 12 is viewed so that the protrusion 16 is to the right of the hexagonal member 14, as in FIG. 1, the outer threads 15 slant towards the left or towards member 14 starting from the bottom of the protrusion 16 to the top of the protrusion 16 as shown in FIG. 1. The internal threads 19 shown in FIG. 5, are threaded in the opposite direction from the external threads 15, shown in FIG. 1, so that the internal threads 19 slant towards the right or towards the end 16a of the protrusion 16 of the first portion 12.

FIG. 6 shows a front view of the apparatus 10 along with a cross sectional front view of a device 100 into which part of the apparatus 10 of FIG. 1 may be inserted. In operation, the end 20a of the second portion 20 is inserted into an opening 102 at an end 100a of the device 100. The device 100 is substantially in the form of a hollow cylindrical tube with internal threads or indentations 104 including thread 104a, near the end 100a. The device 100 has a peripheral wall 102. The device 100 has a chamber or cavity 106. The end 20a of the portion 20 continues to be inserted into the chamber 106 of the device 100, until the outer threads 15 or protrusion 16 come in contact with the inner threads 104 of the device 100. In the view of FIG. 6, the outer threads 15 are slanted in the same direction as the inner threads 104. The outer threads 15 mesh with or screw into the inner threads 104 by turning the member 14 clockwise, with respect to the view of FIG. 2, and while the device 100 remains stationary.

The apparatus 10 can be unscrewed and detached from the device 100 by turning the member 14 counterclockwise with respect to the device 100, and with respect to the view of FIG. 2.

The second portion 20 of the apparatus 10 can be unscrewed and detached from the first portion 12 by turning the portion 20 clockwise, with respect to the view of FIG. 3. The second portion 20 can be screwed back onto the first portion 12 by inserting the end 22a into the opening 18 shown in FIG. 4, and turning the portion 20 counterclockwise, with respect to the view of FIG. 3, and while the first portion 12 remains stationary.

Having the internal threads 19 threaded oppositely from the external threads 15, allows the apparatus 10 to be taken out of the device 100 without the second portion or pencil 20 becoming detached or unscrewed from the first portion or plug 12. i.e. turning the member 14 counterclockwise with respect to the view of FIG. 2, unscrews the protrusion 16 from the threads 104 of the device 100, without unscrewing the second portion or pencil 20 from the first portion or plug 12.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a first portion; and
a second portion;
wherein the first portion has an outer surface having external threads and an inner cavity having internal threads, and wherein the external threads and internal threads are threaded in opposite hand directions;
wherein the second portion has an end having external threads and wherein the external threads of the second portion can be screwed into the internal threads of the first portion to attach the second portion to the first portion;
wherein the second portion includes a first section and a second section;
wherein the first section is directly connected to the second section;
wherein the first section has external threads and the second section has no external threads;
wherein the first section has a first length and the second section has a second length;
wherein the second length is substantially longer than the first length;
wherein the first section can be inserted into the inner cavity of the first portion so that all of the external threads of the first section are inside the inner cavity; and
wherein the first portion is a plug and the second portion is a pencil.

2. The apparatus of claim 1 wherein
the second portion is a zinc pencil.

3. The apparatus of claim 1 wherein
the second portion is substantially cylindrically shaped.

4. An apparatus comprising:
a first portion; and
a second portion;
wherein the first portion has an outer surface having external threads and an inner cavity having internal threads, and wherein the external threads and internal threads are threaded in apposite hand directions;
wherein the second portion has an end having external threads and wherein the external threads of the second portion can be screwed into the internal threads of the first portion to attach the second portion to the first portion; and
wherein
the first portion is a plug; and
the second portion is a pencil.

5. The apparatus of claim 4 wherein
the second portion is a zinc pencil.

6. The apparatus of claim 4 further comprising
a device having a cavity with internal threads,
and wherein the external threads of the first portion can be screwed into the internal threads of the device so that the first portion is attached to the device, and wherein while the external threads of the first portion are screwed into the internal threads of the device, at least part of the second portion lies inside of the cavity of the device.

7. The apparatus of claim 6 wherein
the second portion is a zinc pencil.

8. The apparatus of claim 6 wherein
the device is part of an engine.

9. The apparatus of claim 8 wherein
the device is part of a marine engine.

10. The apparatus of claim 4 wherein
the second portion is substantially cylindrically shaped.

11. An apparatus comprising:
a first portion; and
a second portion;
wherein the first portion has an outer surface having external threads and an inner cavity having internal threads, and wherein the external threads and internal threads are threaded in opposite hand directions;
wherein the second portion has an end having external threads and wherein the external threads of the second portion can be screwed into the internal threads of the first portion to attach the second portion to the first portion;
wherein the second portion includes a first section and a second section;
wherein the first section is directly connected to the second section;
wherein the first section has external threads and the second section has no external threads;
wherein the first section has a first length and the second section has a second length;
wherein the second length is substantially longer than the first length;
further comprising a device having a cavity with internal threads,
and wherein the external threads of the first portion can be screwed into the internal threads of the device so that the first portion is attached to the device, and wherein while the external threads of the first portion are screwed into the internal threads of the device, both the first section and the second section lie inside of the cavity of the device; and
wherein the first portion is a plug and the second portion is a pencil.

12. The apparatus of claim 11 wherein
the second portion is a zinc pencil.

13. The apparatus of claim 11 wherein
the second portion is substantially cylindrically shaped.

* * * * *